United States Patent
Nakashima

Patent Number: 5,627,253
Date of Patent: May 6, 1997

[54] SIH-FUNCTIONAL POLYIMIDE RESIN

[75] Inventor: Hisataka Nakashima, Fukuoka Prefecture, Japan

[73] Assignee: Dow Corning Toray Silicone Co., Ltd., Tokyo, Japan

[21] Appl. No.: 579,508

[22] Filed: Dec. 27, 1995

[30] Foreign Application Priority Data

Dec. 27, 1994 [JP] Japan .................................. 6-340566

[51] Int. Cl.$^6$ .................................................... C08G 77/12
[52] U.S. Cl. ........................... 528/31; 525/431; 528/38; 528/271; 528/272; 528/332; 528/335; 556/425
[58] Field of Search ...................... 528/31, 26, 28, 528/38, 10, 271, 272, 332, 335; 525/431; 556/425

[56] References Cited

U.S. PATENT DOCUMENTS 5,473,040 12/1995 Kunimune et al. .................. 528/26

FOREIGN PATENT DOCUMENTS

| | | |
|---|---|---|
| 525741A1 | 2/1993 | European Pat. Off. . |
| 1204931 | 8/1989 | Japan . |
| 6080783 | 3/1994 | Japan . |
| 80779 | 3/1994 | Japan . |
| 80783 | 3/1994 | Japan . |

OTHER PUBLICATIONS

Polymer Preprints, Japan, vol. 42, pp. 486-487, 1496 (1993).

Primary Examiner—Terressa Mosley
Attorney, Agent, or Firm—Alexander Weitz

[57] ABSTRACT

A polyimide resin having excellent storage stability which cures to give a highly adherent, highly heat-resistant, and highly moisture-resistant film is disclosed, said resin being prepared by reacting (A) a tetracarboxylic dianhydride and (B) a diamino-functional siloxane compound having the general formula

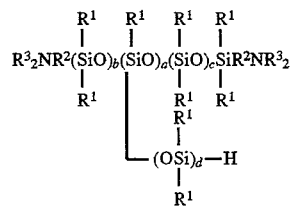

in which each $R^1$ is independently selected from $C_1$ to $C_{20}$ monovalent hydrocarbon radicals, each $R^2$ is independently selected from $C_1$ to $C_{20}$ divalent hydrocarbon radicals, $R^3$ is selected from the group consisting of hydrogen and —$SiR^1_3$ wherein $R^1$ is defined as above, a is an integer from 1 to 20, b is an integer from 1 to 20, c is an integer from 0 to 20, and d is an integer from 1 to 20.

16 Claims, No Drawings

SIH-FUNCTIONAL POLYIMIDE RESIN

DETAILED DESCRIPTION OF THE INVENTION

1. Field of the Invention

This invention relates to polyimide resin that contains silicon-bonded hydrogen on organosiloxane in the main chain. The invention also relates to a method for preparing the aforesaid polyimide resin. More particularly, the present invention relates to a polyimide resin that has an excellent solution storage stability and that cures to give a highly adherent, highly heat-resistant, and highly moisture-resistant cured film.

2. Background of the Invention

Polyimide resins exhibit excellent heat resistance, excellent mechanical properties, and excellent electrical properties. As a result, they are used as heat-resistant films, molding resins, coatings, adhesives, alpha-radiation-shielding films, and the like.

SiH-functional polyimide resins are already known. For example, Japanese Patent Application Laid Open Number Hei 6-80779 discloses a polyimide resin whose terminals are capped by an SiH-containing tetrahydrophthalic anhydride derivative. Japanese Patent Application Laid Open Number Hei 6-80783 discloses a polyimide resin whose terminals are capped by an SiH-functional organic radical. These resins are starting materials for the synthesis of thermosetting resins through their reaction, in the presence of hydrosilylation catalyst, with olefinic group-containing polymers. The SiH is present in terminal position in both of these polyimide resins (hereinafter abbreviated as terminal-SiH polyimide resin). Polyimide resin bearing SiH in the main chain (hereinafter abbreviated as main chain-SiH polyimide resin) is reported in Polymer Preprints, Japan, volume 42, pp. 486, 487, 1496 (1993). There is also a report of main chain-SiH polyimide resin prepared by running a Dieis-Alder reaction between dibutadienylsilane (synthesized from dichlorosilane and the Grignard reagent of butadiene) and maleic anhydride to give a SiH-functional acid anhydride, which is then reacted with aromatic diamine.

One drawback to the terminal-SiH polyimide resins is the narrow range from which their SiH content can be selected. While the introduction of SiH into the main chain of polyimide resins is a good strategy for broadening this range, the main chain-SiH polyimide resins described above present problems from a preparative standpoint. These problems include requiring a multistep reaction sequence for synthesis of the intermediates and the necessity for going through a Grignard reaction step, which is associated with large amounts of by-products.

SUMMARY OF THE INVENTION

It has now been discovered that an excellent storage stability is exhibited by the solutions of the instant polyimide resin as well as by the solutions of its precursor and that these polyimide resins exhibit an excellent adherence to a variety of substrates.

In specific terms, the present invention takes as its object the introduction of a novel polyimide resin that has silicon-bonded hydrogen on organosiloxane in the main chain. An additional object of the invention is a method for preparing said polyimide resin. Other objects of the present invention are the introduction of a polyimide resin that has an excellent solution storage stability and that is highly adherent to a variety of substrates and the introduction of a method for preparing said polyimide resin.

The present invention therefore relates to polyimide which is prepared by reacting (A) a tetracarboxylic dianhydride
and
(B) a diamino-functional siloxane compound having the general formula

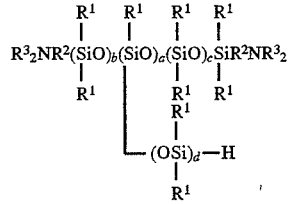

in which each $R^1$ is independently selected from $C_1$ to $C_{20}$ monovalent hydrocarbon radicals, each $R^2$ is independently selected from $C_1$ to $C_{20}$ divalent hydrocarbon radicals, $R^3$ is a hydrogen atom or an $SiR^1_3$ group wherein $R^1$ is defined as above, a is an integer from 1 to 20, b is an integer from 1 to 20, c is an integer from 0 to 20, and d is an integer from 1 to 20.

The invention also relates to a method for the preparation of the above polyimide resin, wherein said method is characterized by first synthesizing a polyamic acid intermediate by the reaction of the above described components at a component (A):component (B) molar ratio of 1:0.5 to 1:1.5, and thereafter subjecting said polyamic acid intermediate to a cycloimidation reaction.

The present invention has been disclosed in Japanese Laid Open Patent Application Number Hei 6-340566, the full disclosure of which is hereby incorporated by reference.

DETAILED DESCRIPTION OF THE INVENTION

The tetracarboxylic dianhydride (A) used by the present invention comprises those tetracarboxylic dianhydrides known as precursors for polyimide resins. This component is specifically exemplified by pyromellitic dianhydride, benzophenonetetracarboxylic dianhydride, 3,3',4,4'-biphenyltetracarboxylic dianhydride, 2,2 bis(3,4 benzenedicarboxylic anhydride)perfluoropropane, and the like. These may be used individually or as mixtures of two or more.

The diamino-functional siloxane compound (B) used by the present invention has the following formula.

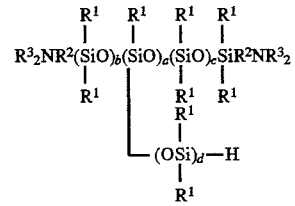

Each $R^1$ in this formula is independently selected from monovalent hydrocarbon radicals having 1 to 20 carbons, and $R^1$ is specifically exemplified by alkyl radicals such as methyl, ethyl, propyl, and butyl; and by aryl radicals such as phenyl, tolyl, xylyl, and naphthyl. Each $R^2$ is independently selected from divalent hydrocarbon radicals having 1 to 20 carbons, and $R^2$ is specifically exemplified by alkylene radicals such as methylene, ethylene, propylene, butylene, heptylene, and hexylene; and by arylene radicals such as phenylene, and tolylene. $R^3$ is the hydrogen atom or an $SiR^1_3$ group wherein $R^1$ is defined as above. $R^3$ is specifically exemplified by the hydrogen atom, trimethylsilyl, tert-butyldimethylsilyl, and so forth. The subscript a is an integer having a value of 1 to 20; b is an integer having a value of 1 to 20; c is an integer having a value of 0 to 20; and d is an integer having a value of 1 to 20.

This diamino-functional siloxane compound is specifically exemplified by the following compounds, in which Me hereinafter denotes a methyl radical.

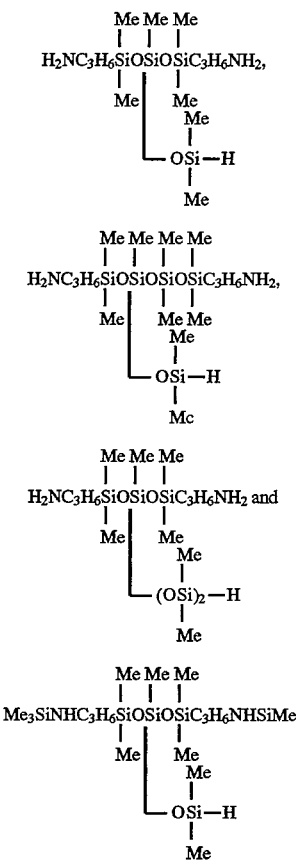

Various methods exist for the preparation of the diamino-functional siloxane compounds. One example of such a preparative method ie provided by the following equation.

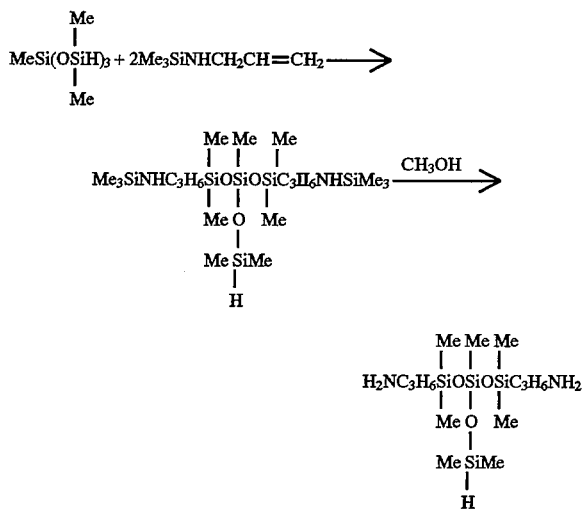

Insofar as the objects of the present invention are not impaired, the present method contemplates the copolymerization of other diamino compounds with the aforementioned diamino-functional siloxane compound. Other diamino compounds are exemplified by aromatic diamines such as p-phenylenediamine, m-phenylenediamine, 4,4'-diaminodiphenyl ether, 4,4'-diaminodiphenylmethane, 4,4'-diaminodiphenylpropane, 4,4'-diaminodiphenyl sulfone, and the like; aliphatic diamines such as cthylcnediamine, hexamethylenediamine, decamethylenediamine, and so forth; and diamino-functional siloxane compounds with the following formulas.

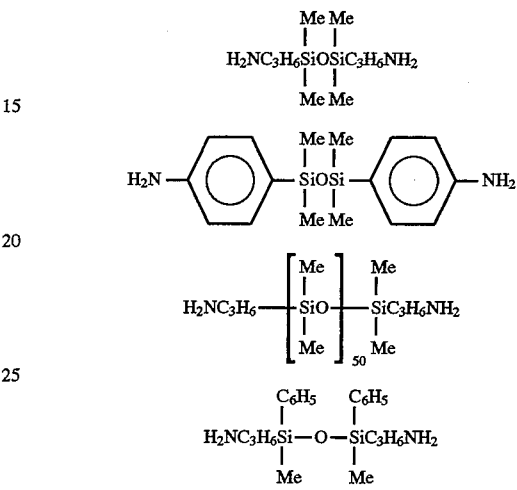

Polyimide resin according to the present invention is prepared by first synthesizing the polyamic acid intermediate by reacting the above-described tetracarboxylic dianhydride (A) with the above-described diamino-functional siloxane compound (B) and thereafter subjecting this polyamic acid intermediate to cycloimidation.

The component (A): component (B) molar ratio should be from 1:0.5 to 1:1.5 and is preferably from 1:0.8 to 1:1.2.

The use of solution polymerization methodologies will generally be advantageous for the synthesis of subject polyamic acid intermediate. The solvent employed in this solution polymerization is exemplified by N,N-dimethylformamide, N,N-dimethylacetamide, N-methyl-2-pyrrolidinone, dimethyl sulfoxide, diethylene glycol dimethyl ether, dibutyl ether, toluene, xylene, butyrolactone, and the like. These may be used singly or as mixtures of two or more.

The temperature for synthesis of the polyamic acid intermediate generally ranges from −20° C. to 150° C. and preferably ranges from −5° C. to 100° C.

Various methods are available for running the cycloimidation of the polyamic acid intermediate to give the polyimide resin. One example thereof is azeotropic dehydration. For example, a solution of solvent-soluble polyimide can be obtained by mixing an azeotropic dehydrating solvent, such as toluene or xylene, with the aforementioned polyamic acid solution and running an azeotropic dehydration on this by heating at 80° C. to 300° C., preferably at 120° C. to 200° C. In addition, highly adherent polyimide resin can be produced on a substrate, such as a silicon wafer, aluminum sheet, etc., by coating thereon the polyamic acid solution or polyimide solution and then curing by heating to 100° C. to 300° C. and preferably 130° C. to 250° C.

The polyimide resin according to the present invention as described hereinbefore exhibits an excellent solution stability and cures to give a cured film that is highly adherent and strongly resistant to heat and moisture. These properties make the polyimide resin according to the present invention useful as a protective coating for electronic components where heat and moisture resistance are critical.

EXAMPLES

The invention will be explained more specifically below through working examples, in which Me designates the methyl radical.

Example 1 pyromellitic dianhydride (6.3 g) and 34.8 g of a mixture of N,N-dimethylacetamide and xylene (mixture weight ratio—95:5) were introduced under a nitrogen current into a four-neck flask equipped with a stirrer, addition funnel, and thermometer and were stirred. A diamino-functional siloxane compound (11.1 g) with the following formula

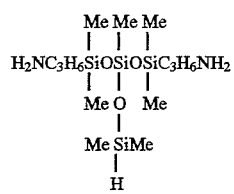

and 34.8 g of a mixture of N,N-dimethylacetamide and xylene (mixture weight ratio=95:5) were then added dropwise from the addition funnel over a period of 29 minutes, during which time the reaction temperature varied from 29° C. to 37° C. The reaction was subsequently stirred for 3.5 hours at 37° C. to 26° C. A Dean-Stark trap was then attached and an azeotropic dehydration was run for 8 minutes at 144° C. to 146° C. Cooling to room temperature and filtration then gave 77.3 g of a solution of a polyimide with the following repeat units:

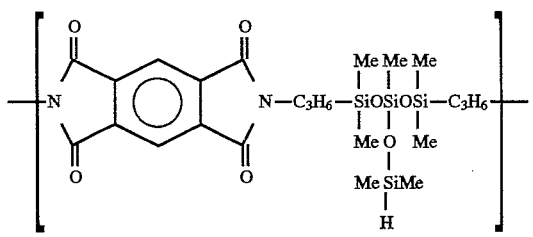

The infrared absorption spectrum taken on this solution contained the SiH signal at 2130 cm$^{-1}$ and signals for the imide moiety at 1780 cm$^{-1}$ and 1720 cm$^{-1}$. When this polyimide solution was held for 6 months at room temperature, it remained homogeneous and was free of such changes as the development of gel or precipitate, an increase in viscosity, and the like.

The prepared polyimide solution was also coated on a silicon wafer, glass plate, and aluminum sheet, and the respective polyimide films were prepared by an initial cure carried out by heating for 3 hours at 160° C. in an oven. This was followed by a pressure cooker test for 20 hours at 121° C. and 100% RH. Crosscut adhesion testing was run on each of the polyimide films, and these results are reported in Table 1. The instant polyimide resin exhibited an excellent adhesion for the various substrates.

Example 2

Pyromellitic dianhydride (7.1 g) and 48.6 g of a mixture of N,N-dimethylacetamide and xylene (mixture weight ratio=95:5) were introduced under a nitrogen current into a four-neck flask equipped with a stirrer, addition funnel, and thermometer and were stirred. A diamino-functional siloxane compound (17.2 g) with the following formula

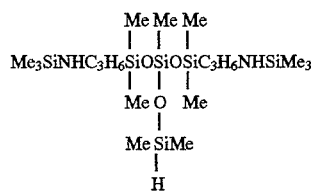

and 48.6 g of a mixture of N,N-dimethylacetamide and xylene (mixture weight ratio—95:5) were then added dropwise from the addition funnel over a period of 35 minutes, during which time the reaction temperature varied from 28° C. to 36° C. The reaction was subsequently stirred for 3 hours at 36° C. to 26° C. A Dean-Stark trap was then attached and an azeotropic dehydration was run for e minutes at 135° C. to 142° C. Cooling to room temperature and filtration then gave 104.2 g of a solution of a polyimide with the following repeat units:

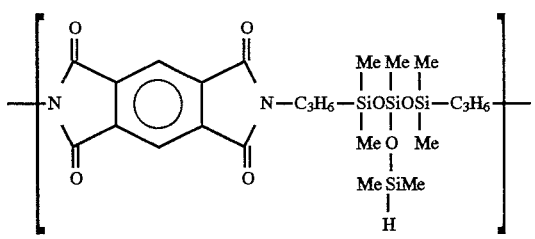

The infrared absorption spectrum taken on this solution contained the SiH signal at 2130 cm$^{-1}$ and signals for the imide moiety at 1780 cm$^{-1}$ and 1720 cm$^{-1}$ when this polyimide solution was held for 6 months at room temperature, it remained a homogeneous solution and was free of such changes as the development of gel or precipitate, an increase in viscosity, and the like.

This polyimide solution was also subjected to crosscut adhesion testing as in Example 1, and these results are reported in Table 1. The instant polyimide resin exhibited an excellent adhesion for the various substrates.

Example 3

Pyromellitic dianhydride (7.1 g) and 38.0 g of a mixture of N,N-dimethylacetamide and xylene (mixture weight ratio=95:5) were introduced under a nitrogen current into a four-neck flask equipped with a stirrer, addition funnel, and thermometer and were stirred. A diamino-functional siloxane compound (11.2 g) with the following formula

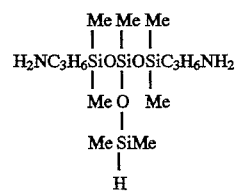

0.7 g of 4,4'-diaminodiphenyl ether, and 38.0 g of a mixture of N,N-dimethylacetamide and xylene (mixture weight ratio=95:5) were then added dropwise from the addition funnel over a period of 32 minutes, during which time the reaction temperature varied from 25° C. to 29° C. The reaction was subsequently stirred for 4 hours at 29° C. to 25° C. followed by azeotropic dehydration. Cooling to room temperature and filtration then gave 90.9 g of a solution of a polyimide with the following repeat units:

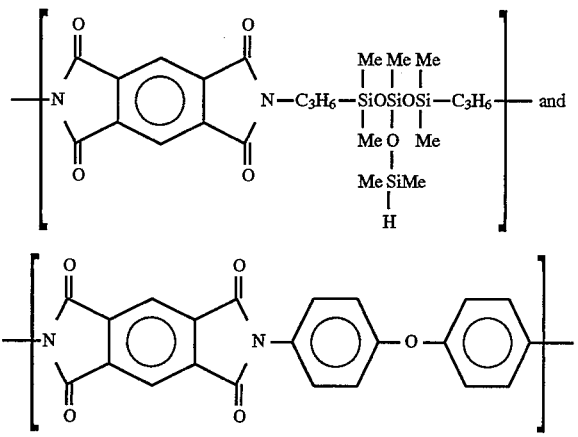

these units being present in a molar ratio of 9 to 1, respectively.

The infrared absorption spectrum taken on this solution contained the SiH signal at 2130 cm$^{-1}$ and signals for the imide moiety at 1780 cm$^{-1}$ and 1720 cm$^{-1}$. When this polyimide solution was held for 6 months at room temperature, it remained a homogeneous solution and was free of such changes as the development of gel or precipitate, an increase in viscosity, and the like.

This polyimide solution was also subjected to crosscut adhesion testing as in Example 1, and these results are reported in Table 1. The instant polyimide resin exhibited an excellent adhesion for the various substrates.

Comparative Example 1

Pyromellitic dianhydride (6.4 g) and 31.5 g of a mixture of N,N-dimethylacetamide and xylene (mixture weight ratio=95:5) were introduced under a nitrogen current into a four-neck flask equipped with a stirrer, addition funnel, and thermometer and were stirred. A diamino-functional siloxane compound (9.4 g) with the following formula

and 31.5 g of a mixture of N,N-dimethylacetamide and xylene (mixture weight ratio=95:5) were then added dropwise from the addition funnel over a period of 14 minutes, during which time the reaction temperature varied from 26° C. to 33° C. The reaction was subsequently stirred for 3 hours at 33° C. to 25° C. A Dean-Stark trap was then attached and an azeotropic dehydration was run for i3 minutes at 140° C. to 144° C. Cooling to room temperature and filtration then gave 64.6 g of a solution of a polyimide with the following formula repeat units:

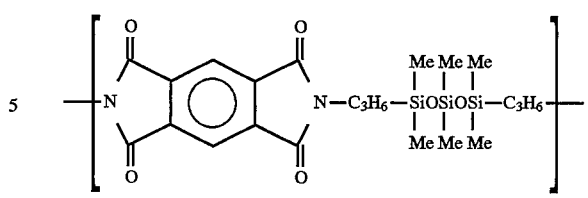

The infrared absorption spectrum taken on this solution contained signals for the imide moiety at 1780 cm$^{-1}$ and 1720 cm$^{-1}$. The development of a white precipitate was observed on the second day as this polyimide solution was held at room temperature.

This polyimide solution was also subjected to crosscut adhesion testing as in Example 1, and these results are reported in Table 1. For each substrate the performance of this polyimide resin was inferior to that of the SiH-functional polyimide resins of Examples 1 to 3.

Table 1

| | Results of crosscut adhesion testing on the polyimide films[1] | | | | | |
|---|---|---|---|---|---|---|
| | conditions | | | | | |
| | after initial cure (160° C., 3 hours) | | | after pressure cooker test (121° C., 100% RH, 20 hours) | | |
| substrate: | silicon wafer | glass | Al | silicon wafer | glass | Al |
| Example 1 | 0 | 0 | 0 | 0 | 3 | 0 |
| Example 2 | 0 | 0 | 0 | 0 | 2 | 0 |
| Example 3 | 0 | 2 | 1 | 0 | 4 | 4 |
| Comparative Example 1 | 67 | 76 | 63 | 100 | 77 | 90 |

[1] The values reported in the table represent the number of peeled squares out of a possible 100 squares.

That which is claimed is:

1. A polyimide resin prepared by reacting
(A) a tetracarboxylic dianhydride and
(B) a diamino-functional siloxane compound having the general formula

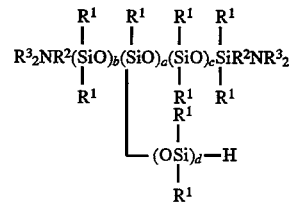

in which each $R^1$ is independently selected from $C_1$ to $C_{20}$ monovalent hydrocarbon radicals, each $R^2$ is independently selected from $C_1$ to $C_{20}$ divalent hydrocarbon radicals, $R^3$ is selected from the group consisting of hydrogen and —$SiR^{13}$ wherein $R^1$ is defined as above, a is an integer from 1 to 20, b is an integer from 1 to 20, c is an integer from 0 to 20, and d is an integer from 1 to 20.

2. The polyimide resin according to claim 1, wherein $R^1$ is methyl.

3. The polyimide resin according to claim 2, wherein $R^3$ is hydrogen.

4. The polyimide resin according to claim 2, wherein said diamino-functional siloxane compound (B) has a formula selected from the group consisting of

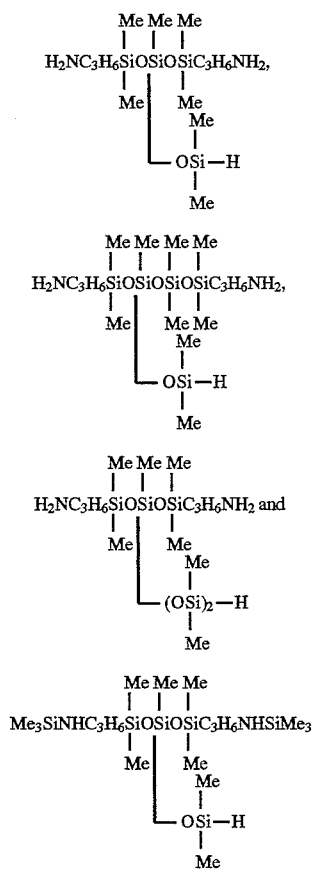

in which Me denotes a methyl radical.

5. The polyimide resin according to claim 1, wherein a=1, b=1 and c=1.

6. The polyimide resin according to claim 5, wherein $R^1$ is methyl.

7. The polyimide resin according to claim 6, wherein $R^3$ is hydrogen.

8. The polyimide resin according to claim 1, wherein said dianhydride (A) is selected from the group consisting of pyromellitic dianhydride, benzophenonetetracarboxylic dianhydride, 3,3',4,4'-biphenyltetracarboxylic dianhydride and 2,2-bis(3,4-benzenedicarboxylic anhydride) perfluoropropane.

9. The polyimide resin according to claim 8, wherein a=1, b=1 and c=1.

10. The polyimide resin according to claim 9, wherein $R^1$ is methyl.

11. The polyimide resin according to claim 10, wherein $R^3$ is hydrogen.

12. The polyimide resin according to claim 8, wherein said diamino-functional siloxane compound (B) has a formula selected from the group consisting of

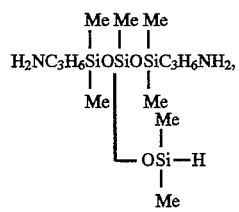

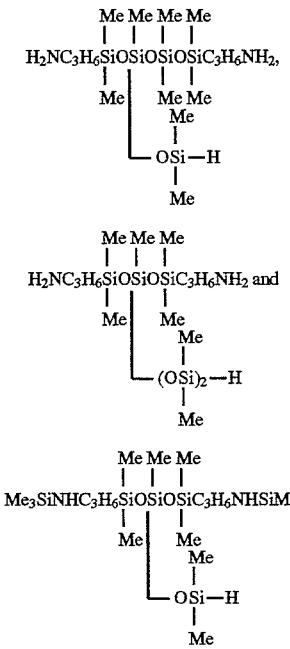

in which Me denotes a methyl radical.

13. A method for preparing a polyimide resin comprising:
(I) reacting
(A) a tetracarboxylic dianhydride and
(B) a diamino-functional siloxane compound having the general formula

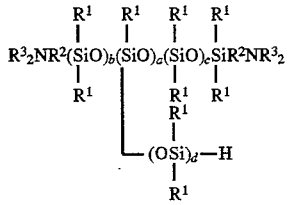

in which each $R^1$ is independently selected from $C_1$ to $C_{20}$ monovalent hydrocarbon radicals, each $R^2$ is independently selected from $C_1$ to $C_{20}$ divalent hydrocarbon radicals, $R^3$ is selected from the group consisting of hydrogen and $-SiR^1_3$ wherein $R^1$ is defined as above, a is an integer from 1 to 20, b is an integer from 1 to 20, c is an integer from 0 to 20, and d is an integer from 1 to 20, wherein said component (A) and said component (B) is reacted in a molar ratio of 1:0.05 to 1:1.5, thereby forming a polyamic acid; and (II) reacting the polyamic acid from step (I) to form a polyimide.

14. The method according to claim 13, wherein $R^1$ is methyl.

15. The method according to claim 14, wherein $R^3$ is hydrogen.

16. The method according to claim 13, wherein said dianhydride (A) is selected from the group consisting of pyromellitic dianhydride, benzophenonetetracarboxylic dianhydride, 3,3',4,4'-biphenyltetracarboxylic dianhydride and 2,2-bis(3,4-benzenedicarboxylic anhydride) perfluoropropane.

* * * * *